Patented Dec. 1, 1931

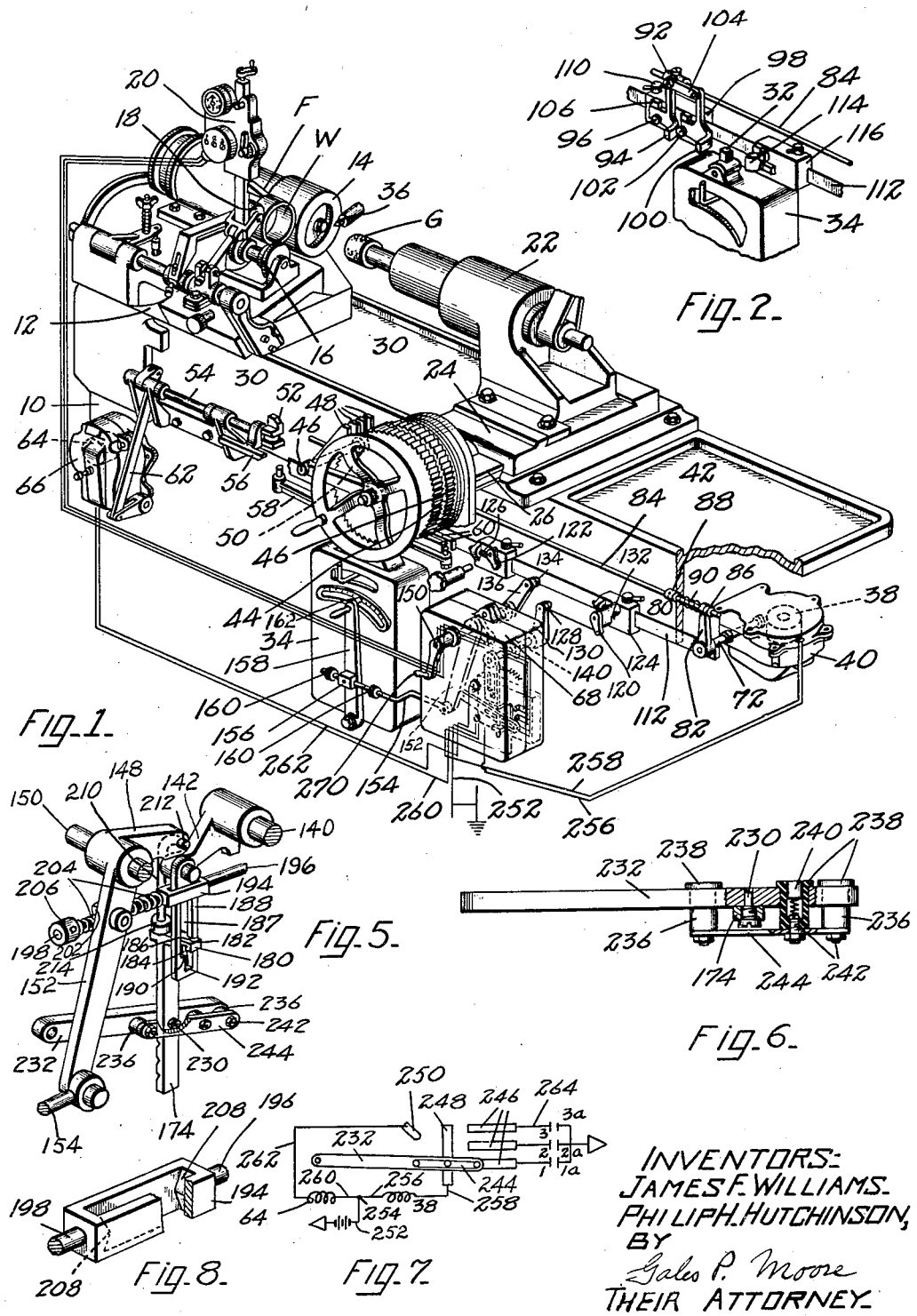

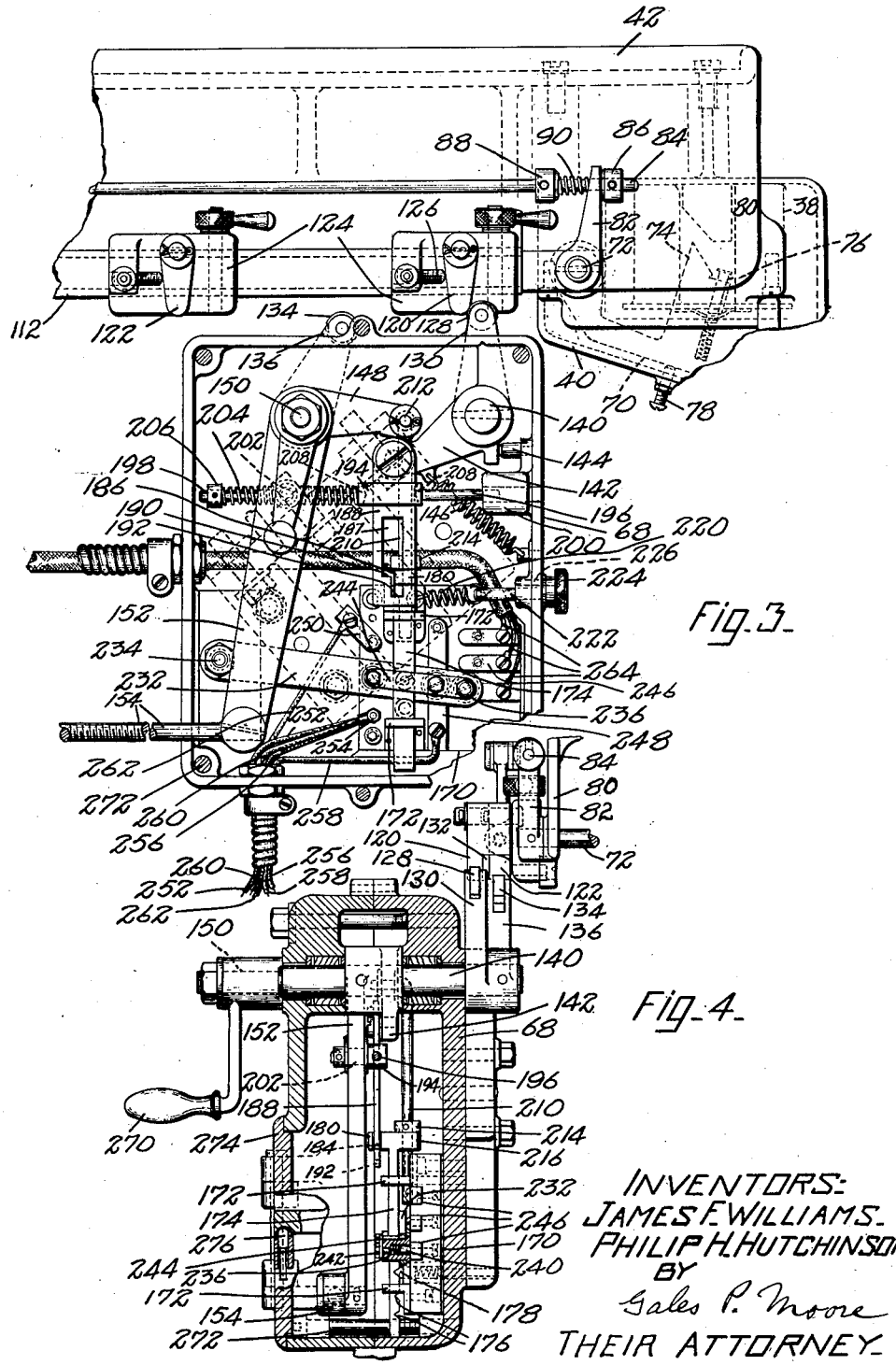

1,834,755

UNITED STATES PATENT OFFICE

JAMES F. WILLIAMS, OF LYNDHURST, AND PHILIP H. HUTCHINSON, OF MONTCLAIR, NEW JERSEY, ASSIGNORS TO GENERAL MOTORS CORPORATION, OF DETROIT, MICHIGAN, A CORPORATION OF DELAWARE

CUTTING MACHINE

Application filed May 20, 1929. Serial No. 364,684.

This invention relates to cutting machines and comprises all the features of novelty herein disclosed. An object of the invention is to provide improved mechanism for controlling the motions of a reciprocating table and a cross feed carriage. Another object is to provide an improved combination of dogs and motor devices for controlling amplified reciprocations of a table and a back-off device for a tool carriage. Another object is to provide improved mechanism for controlling the operations of a grinding machine such that the cycle of operations may be begun at any stage without waiting for the completion of a previous cycle. Still another object is to provide improved mechanism for effecting the progressive movement of switch mechanism to set the table controlling devices for successive operation.

To these ends and to improve generally upon devices of this character, the invention further resides in the various matters hereinafter disclosed and claimed. In its broader aspects, the invention is not necessarily limited to the specific construction selected for illustration in the accompanying drawings in which Fig. 1 is a perspective view of the machine.
Fig. 2 is a perspective view of certain details.
Fig. 3 is a front view of a portion of the machine with some parts removed.
Fig. 4 is an end view and section of parts appearing in Fig. 3.
Fig. 5 is a perspective view of certain details.
Fig. 6 is a sectional view of certain details.
Fig. 7 is a diagram.
Fig. 8 is a perspective view of a detail.

The machine comprises a frame 10 having a raised bridge 12 at one end to support a work head. The head may be of the usual chuck type or of the chuckless type indicated and comprising a backing wheel 14, a supporting idler wheel 16, and a pressure idler wheel 18. The work-piece W, such as a sleeve or ring to be internally ground, is supported and rotated by the wheels while a grinding wheel G enters one end of the work and a feeler gauge F, having a series of movable electric contacts in a gauge housing 20, enters the opposite end. The grinding wheel is rotatably mounted in a head 22 on a cross feed carriage or slide 24 which is fed by a screw shaft along dovetail ways 26 of a reciprocating table 30. The table extends lengthwise of the frame and slides under the bridge 12 and the superimposed work head. The table is reciprocated by any suitable mechanism, preferably hydraulic, controlled by dogs engaging a reversing lever 32 projecting from a valve casing 34. The details of the hydraulic drive, being substantially the well known mechanism shown in patent to Heald, 1,582,468, are not a part of the present invention. The grinding wheel is withdrawn one or more times from the work to travel across a diamond 36 for dressing operations controlled by a motive device, herein shown as a solenoid 38 carried in a housing 40 carried on an extension 42 of the table. The cross feed carriage has a double feed and back off mechanism, described and claimed in a copending application of Williams and Cramer, S. N. 355,848, filed April 17, 1929, and comprising two ratchet wheels 44 and 46 driven by pawls 48 actuated by roller 50 engaging a cam 52 on a rocker rod 54. A plate 56 on the rock rod is arranged to actuate a trip lever 58 which trips holding pawls 60 to release the ratchet wheel for spring actuated return movement. The rock rod is actuated to stop the feed and initiate a reverse feed or back off of the feed carriage by link and lever connected 62 to a motive device, herein indicated as solenoid 64 in a housing 66. The solenoids 38 and 64 are controlled from the feeler F through the instrumentality of mechanism most of which is housed in control box 68.

Referring to Fig. 3, an arm 70 fixed rock shaft 72 carries a core 74 to the windings of the solenoid 38, a spring pin 76 in the core serving as a buffer acting to insure release of the core solenoid is not energized. An screw 78 limits the rocking of the shaft 72 is journalled in the house in a depending flange 80 at the table extension 42 and carries an arm 82 which is slotted to receive a long shiftable rod 84. Collars 86 and 88 are adjustably clamped to the rod, one collar engaging the arm 82 directly and the other having a coiled spring 90 interposed between it and the arm to provide a yielding actuation of the rod in one direction.

Referring to Fig. 2, a collar 92 is adjustably secured near the other end of the shiftable rod and is pivotally connected by a screw stud to a latch or dog 94 which is pivoted at 96 to a plate 98. A similar latch or dog 100 is pivoted at 102 to the plate and is connected by a link 104 to the dog 94 to swing with the latter under control of the rod. Suitable lugs 106 on the plate 98 limit the swinging of the dogs and each dog has a bevelled face under the end to enable it to ride over the reversing lever 32 in one direction. The plate 98 is adjustably clamped by a hand screw 110 to a dovetail bar 112 fastened to the table and its extension. A reversing dog 114 is pivoted on a plate 116 adjustably attached to the dovetail bar in a position to engage the reversing lever, this dog and the movable dog 100 alternately engaging the reversing lever to cause the short reciprocation of the table when the grinding wheel is in the bore of the work. The dog 100 is lifted, preferably a plurality of times, under control of the solenoid to let the table carry the grinding wheel out for dressing on the diamond. The dog 94 is also lifted with dog 100 but drops almost immediately to cause the table to return after the dressing operations. Both dogs are finally lifted and held by the solenoid for a period of time sufficient to let the table retreats to a remote position when the grinding. If two dressing operations are formed, the solenoid 38 is energized and energized three times in a cycle, an electric circuit through the solenoid windings completed each time by the feeler e. The circuit is broken each time and ready for successive gauging operation by switch mechanism operated by other on the table. The solenoid 64 is energized on the occasion of the last operation of solenoid 38 to back off the cross feed 24.

r 120 on the table causes progressive its of the switch mechanism and a restores the switch mechanism to position. These dogs also control down of the table for wheel dressing inish grinding and a subsequent p of the table on its retreat to re-ion. The speed control features described. Each dog is pivoted 124 adjustably clamped to the 112 and is engaged by an adjustew 126 to prevent its swinging on. The outermost dog 120 is extended out into the path of a roller 128 on an arm 130 but has a cut-out portion 132 to enable it to clear a roller 134 on an arm 136 which is operated by the shorter dog 122. The dog 120 is so located on the table that it will engage the roller 128 during the amplified stroke of the table thereby rocking the arm 130 clockwise and subsequently releasing it. The arm is pinned to a rock shaft 140 journalled on antifriction bearings in the box 68. A lifting arm 142 is pinned to the shaft inside the box and is pressed towards a stop pin 144 by a coil spring 146. The lifting arm 142 has a rounded end arranged to engage under a hardened surface on the short arm 148 of a bell crank lever pinned to a rock shaft 150 and having a long arm 152 connected by a bent rod 154 (Fig. 1) to a swivel block 156 on the usual speed control lever 158 at the front of the valve casing 34. The rod is provided with spaced nuts 160 which provide adjustable lost motion with respect to the swivel block. The speed control lever has a suitable detent 162 to yieldably hold the lever in any adjusted position without preventing its subsequent easy movement. During the normal table reciprocation, the dogs 120 and 122 are idle. Upon the first amplified stroke for wheel dressing, the dog 120 rocks the shaft 140 clockwise and, through the arms 142 and 148 swings the long arm 152 counter-clockwise. The rod 154 is thus actuated to move the speed control lever 158 from a high speed position to a lower speed position where it remains. The table therefore reciprocates slowly during wheel dressing and finish grinding. The arm 142 is restored by the coil spring to its lowered position but the arm 148 remains in its raised position and is unaffected by any subsequent actuation of rock shaft 140 during a repeated dressing operation. The arm 136 is pinned to the rear end of the rock shaft 150 so that, when the table is slowed down for the first dressing operation, the roller 134 is placed in the subsequent path of the dog 122. Then, on the final long retreat of the table, the dog 122 engages roller 134 and rocks the shaft 150 and so restores the speed control lever to high speed position to effect a rapid run out.

As above mentioned, the dogs 120 and 122 also control the progressive movement of a switch in the box 68 to successively set a plurality of connections for directing power to the solenoids. A base 170 of insulating material is secured to the inside of the box and supports two slotted angle plates 172 which form guides for a vertically slidable bar 174. The bar is provided on its rear face with a series of shallow notches 176 engaged successively by a spring pressed locating pin 178 guided in a sleeve which is set in a hole of the insulating base and screwed to the rear wall of the box. The progressive vertical movement of the bar controls the progressive movement of a switch as will appear. The upper end of the bar is provided with a forwardly projecting lug 180 having a notch 182 at the side and a notch 184 at the bottom leaving a necked down portion 186. The lug projects through a slot 187 in a swingable link 188 which is pivotally hung on the end of the arm 142. The slot has a wide upper portion, a shoulder 190, and a narrow downward extension terminating in a wall 192. The link is initially held in a vertical position with the narrow extension of the slot in vertical alignment with the necked down portion 186 of the lug, the right side of the link occupying the side notch 182. The bottom wall of the necked down portion 186 is initially on a level with the shoulder 190 or above it. When the lifting arm 142 swings up, the link is lifted through a distance at least twice as great as that between the shoulder 190 and the wall 192. This would be sufficient to lift the bar 174 from the lowest to the highest position were it not for the initial lost motion provided between the bottom wall 192 and the necked down portion 186 of the lug. Hence, on the first dressing stroke of the table, the bar is only raised one step. The link is initially held in its vertical position by a yoke 194 surrounding the link and having guide rods 196 and 198, the rod 196 being slidably supported in a hole in a boss 200 and the rod 198 being slidably supported in a swivel pin 202 on the rear of the long arm 152. A coil spring 204 is interposed between the swivel block and the yoke, another similar spring 204 being interposed between the swivel block and a nut 206 on the end of the rod 198. In the normal position of the long arm 152, the slidable yoke is held well to the left by the springs, a bevelled surface 208 of the yoke engaging the right side of the link. When the first dressing operation occurs and the long arm 152 is swung counterclockwise, the spring 204 swings the link to the right thereby putting the shoulder 190 under and in line with the necked down portion 186 of the lug 180. Hence, a subsequent lifting of the link during a subsequent dressing operation will lift the bar 174 another and final step.

To restore the bar 174 to its initial lowered position, the following devices are provided. A push down rod 210 with a forwardly bent upper end 212 is pivotally secured to the end of the arm 148 by a cotter pin. The lower end of the rod is guided in an opening of the upper angle plate 172. A collar 214 is pinned to the rod in position to engage a rearwardly extending lug 216 on the bar 174. Hence, on the final clockwise swinging of the long arm 152, during the final retreat of the table, the bar 174 is shoved down. The same swinging of the arm 152 shifts the yoke 194 to the left through the rod 198 and this swings the slotted link 188 to the left ready to lift the bar 174 again.

The second dressing operation may be omitted if desired and this is accomplished by setting the link 188 initially in its swung over position with the shoulder 190 in the notch 184 directly under the lug 180. A coil spring 220 is attached to the link and to a stud 222 on the box 68. In the position shown, the spring 220 has no tension and no swinging effect on the link but the stud 222 can be pulled outwardly by its knurled head 224 which carries a pin 226 extending into a hole of the box. If the head 224 is pulled outwardly and turned, the pin 226 will engage the outside of the box and so put sufficient tension on the spring 220 to overcome the balancing effect of the springs 204. Hence, the bar 174 will be lifted through its entire range of movement on the first lifting of the link and the second dressing operation will be omitted.

The switch mechanism and circuits comprise the following devices. The bar 174 is connected by a swivel pin 230 to the front of a switch carrier or arm 232 pivoted at 234 in the box. The arm carries a plurality of bushings 236 of insulating material, each provided with a flange 238 interposed between the arm and the insulating base 170. In each bushing is a spring-pressed brush or pin 240. Each spring engages the head of a bolt 242 which extends through the end of the bushing and through a connecting bridge piece 244 which electrically connects all of the screws. Nuts on the outer ends of the bolts secure the bridge piece against the ends of the insulating bushings. The outermost brush or pin 240 is arranged to make successive electric contact with three contact strips 246 which are secured in horizontal grooves of the insulating base. The next brush or pin 240 is arranged to make continuous contact with a contact strip 248 set in a vertical groove of the insulating base. The innermost brush or pin 240 is arranged to make contact with a contact strip 250 which projects from an inclined groove in the base, this last engagement occurring when the first brush makes contact with the uppermost of the contact strips 246.

Referring to the diagram of Fig. 7, a low voltage line wire 252 is grounded on the frame and leads to a binding post 254 on the insulating base. A wire 256 from the binding post leads through the windings of the solenoid 38 and a return wire 258 is connected to the contact strip 248. Another wire 260 from the binding post 254 leads through the windings of the solenoid 64 and a return wire 262 is connected to the contact strip 250. Wires 264 connect the individual contact strips 246 to fixed contacts 1, 2 and 3 in the feeler gauge housing 20. Corresponding movable contacts 1a, 2a and 3a of the gauge are grounded on the frame. The gauge may take various specific forms wherein a feeler engaging the work controls the movement of a series of movable contacts which successively move into engagement with co-operating fixed contacts as in patent to Heald, 1,684,487, for instance. If desired, the wire 262 can be connected directly to the movable contact 3a to eliminate one brush.

The feeler gauge thus controls the successive completion of a series of circuits through the contact strips 246 and the wires 264, first one strip 246 and then another being connected to the strip 248 through the bridge piece and brushes to repeatedly energize the solenoid 38, the strip 250 being finally connected to the strip 248 to energize the solenoid 64, all circuits being set by the table movements. The rock shaft 150 has a crank handle 270 outside the box by which the cycle can be quickly started anew at any time without waiting for the completion of a previously started cycle. The box 68 is conveniently made in two sections mated together by dowel pins and united by clamping bolts 272. A hinged door 274 with spring pressed latch pin 276 provides for quick access to the wire terminals.

In operation the table 30 has the usual short reciprocation when the grinding wheel is in the bore of the work. When the feeler gauge completes the first circuit through the solenoid 38, the dog 100 is lifted temporarily to allow an amplified reciprocation for wheel dressing. As the table comes out, the dog 120 rocks the shaft 140 to break the first circuit and make ready a second circuit by the action of the slotted link 188, bar 174 and switch arm 232. The shaft 150 is simultaneously rocked through the arms 142 and 148 to slow down the table. When the gauge completes the second circuit, the solenoid 38 is energized again to cause a second dressing operation, the second rocking of the shaft 140 causing the switch to be shifted another step to break the second circuit and make ready a third circuit. When the gauge completes the third circuit, both solenoids 38 and 64 are energized, the solenoid 64 controlling the backing away of the cross feed carriage 24 and the solenoid 38 lifting the dogs 94 and 100 and holding them up for an interval to let the table retreat to remote position. As the table retreats, the dog 122 rocks the shaft 150 and this effects a speeding up of the table. When the dog 94 is clear of the reversing lever 32, the rocking of the shaft 150 operates the push down rod 210 breaking the third circuit through the solenoids and making the first circuit ready again.

I claim:

1. In a machine having a reciprocating table with a pair of reversing dogs for alternately engaging a reversing lever, one of said dogs being movably mounted on the table to clear the reverse lever for amplifying the movement of the table, a motive device mounted on the reciprocating table and operatively connected to the movable dog to move the latter clear of the reverse lever, and means for energizing the motive device to move said dog; substantially as described.

2. In a machine having a reciprocating table with a pair of reversing dogs for alternately engaging a reversing lever, one of said dogs being movably mounted on the table to clear the reverse lever for amplifying the movement of the table, a third dog movably mounted on the table, a motive device mounted on the reciprocating table, a rod connecting the motive device to the movable dogs, and means for successively energizing the motive device to move one and then both of said movable dogs; substantially as described.

3. In a machine having a reciprocating table with a pair of reversing dogs for alternately engaging a reverse lever, one of said dogs being movably mounted on the table to clear the reverse lever for amplifying the movement of the table, a third dog movably mounted on the table for engaging the reverse lever to limit the amplified movement, a motive device mounted on the table and operatively connected to the movable dogs, means for energizing the motive device to move one of said movable dogs to effect the amplified movement of the table, means operated by the table for slowing down the amplified movement, and means for subsequently energizing the motive device to move both of said movable dogs; substantially as described.

4. In a machine having a reciprocating table with a pair of reversing dogs for alternately engaging a reversing lever, one of said dogs being movably mounted on the table to clear the reverse lever for amplifying the movement of the table, a third dog movably mounted on the table for engaging the reverse lever to limit the amplified movement, a motive device mounted on the table and operatively connected to the movable dogs, means for energizing the motive device to move one of said movable dogs to effect the amplified movement of the table, means operated by the table during the amplified movement for deenergizing the motive device, and means for subsequently energizing the motive device to move both of said movable dogs; substantially as described.

5. In a machine having a reciprocating table with a pair of reversing dogs for alternately engaging a reversing lever, one of said dogs being movably mounted on the table to clear the reverse lever for amplifying the movement of the table, a third dog movably mounted on the table for engaging the reverse lever to limit the amplified movement, a motive device mounted on the table and operatively connected to the movable dogs, means for energizing the motive device a plurality of times to effect a succession of amplified movements of the table, means operated by the table during the amplified movements for deenergizing the motive device a plurality of times, and means for subsequently energizing the motive device to operate both of the movable dogs, substantially as described.

6. In a machine having a reciprocating table with a pair of reversing dogs for alternately engaging a reversing lever and a cross feed carriage having a feed shaft for advancing and retracting the carriage, a motive device on the table, means for energizing the motive device to cause the reversing lever and one of the dogs to clear one another and effect an amplified reciprocation of the table, a trip member for initiating the retracting movement of the cross feed carriage, a second motive device for actuating the trip member, and means for causing an additional energizing of the first motive device simultaneously with an energizing of the second motive device thereby to effect a long retreating stroke of the table and to initiate retraction of the cross feed carriage; substantially as described.

7. In a machine having a reciprocating table with a pair of reversing dogs for alternately engaging a reversing lever, one of the dogs being movably mounted on the table to clear the reverse lever for amplifying the movement of the table, a cross feed carriage having a feed shaft for advancing and retracting the carriage, a motive device on the table for actuating the movable dog, a trip member for initiating the retracting movement of the cross feed carriage, a second motive device for actuating the trip member, means for energizing the first motive device to effect an amplified reciprocation of the table, means operated by the table for slowing down the amplified reciprocation, and means for subsequently energizing the first motive device simultaneously with the energizing of the second motive device, thereby to effect a long retreating stroke of the table and to initiate retraction of the cross feed carriage; substantially as described.

8. In a machine having a reciprocating table, table reversing mechanism, a motive member for controlling the reversing mechanism, a cross feed carriage having a feed shaft for advancing and retracting the carriage, a trip member for initiating the retraction of the carriage, a motive device for actuating the trip member, a switch, means actuated by the table for moving the switch to repeatedly connect the first motive device to a source of energy to effect a plurality of amplified movements of the table and a subsequent long retreating stroke of the table accompanied by energizing of the second motive device for effecting retraction of the cross feed carriage; substantially as described.

9. In apparatus for controlling the normal reciprocation of a table and amplified movements thereof, a reversing lever and a set of dogs, a motive member for controlling engagement of the lever and dogs, a device having a plurality of connections for successively directing power to the motive device, a movable member for setting the connections successively into operative relation to the motive device, and means for progressively moving the setting member and comprising a swingable link having a slot with a shoulder; substantially as described.

10. In apparatus for controlling the normal reciprocation of a table and amplified movements thereof, a reversing lever and a set of dogs, a motive member for controlling engagement of the lever and dogs, a device having a plurality of connections for successively directing power to the motive device, a movable member for setting the connections successively into operative relation to the motive device, and means for progressively moving the setting member and comprising a swingable link having a slot with a shoulder, and a bar connected to the setting member and having a lug in the slot; substantially as described.

11. In apparatus for controlling the normal reciprocation of a table and amplified movements thereof, a reversing lever and a set of dogs, a motive member for controlling engagement of the lever and dogs, a device having a plurality of connections for successively directing power to the motive device, a movable member for setting the connections successively into operative relation to the motive device, and means for controlling the setting member and comprising a swingable link having a slot with a shoulder, a bar connected to the setting member and having a lug in the slot, and a yielding latch for holding the bar; substantially as described.

12. In apparatus for controlling the normal reciprocation of a table and amplified movements thereof, a reversing lever and a set of dogs, a motive member for controlling engagement of the lever and dogs, a device having a plurality of connections for successively directing power to the motive device, a movable member for setting the connections successively into operative relation to the motive device, and means for controlling the setting member and comprising a link having a slot with a shoulder, a bar connected to the setting member and having a lug in the slot, a latch for yieldingly holding the bar, and means for swinging the link to place the shoulder in engaging relation to the lug; substantially as described.

13. In apparatus for controlling the normal reciprocation of a table and amplified movements thereof, a reversing lever and a set of dogs, a motive member for controlling engagement of the lever and dogs, a device having a plurality of connections for successively directing power to the motive device, a movable member for setting the connections successively into operative relation to the motive device, and means for controlling the setting member and comprising a link having a slot with a shoulder, a bar connected to the setting member and having a lug in the slot, a latch for yieldingly holding the bar, means for swinging the link to place the shoulder in engaging relation to the lug, and means actuated by the table for subsequently swinging the link to place the shoulder out of engaging relation to the lug; substantially as described.

14. In apparatus for controlling the normal reciprocation of a table and amplified movements thereof, a reversing lever and a set of dogs, a motive member for controlling engagement of the lever and dogs, a device having a plurality of connections for successively directing power to the motive device, a movable member for setting the connections successively into operative relation to the motive device, and means for controlling the setting member and comprising a link having a slot with a shoulder, a bar having a lug in the slot, a latch for yieldingly holding the bar, means for swinging the link to place the shoulder in engaging relation to the lug, means actuated by the table for subsequently swinging the link to place the shoulder out of engaging relation to the lug, and means for moving the bar with respect to the link; substantially as described.

In testimony whereof we hereunto affix our signatures.

JAMES F. WILLIAMS.
PHILIP H. HUTCHINSON.